(12) United States Patent
Miki et al.

(10) Patent No.: US 8,272,293 B2
(45) Date of Patent: Sep. 25, 2012

(54) BICYCLE SHIFT OPERATING DEVICE (75) Inventors: Yoshimitsu Miki, Osaka (JP); Takashi Kuruse, Osaka (JP)

(73) Assignee: Shimano Inc., Osaka (JP)

( * ) Notice: Subject to any disclaimer, the term of this patent is extended or adjusted under 35 U.S.C. 154(b) by 172 days.

(21) Appl. No.: 12/861,876

(22) Filed: Aug. 24, 2010

(65) Prior Publication Data

US 2012/0048054 A1 Mar. 1, 2012

(51) Int. Cl.
F16C 1/10 (2006.01)
(52) U.S. Cl. ...................................... 74/502.2
(58) Field of Classification Search .................. 74/501.6, 74/502.2, 502.6
See application file for complete search history.

(56) References Cited

U.S. PATENT DOCUMENTS

| 4,132,296 | A | * | 1/1979 | Evett | 192/217 |
| 5,257,683 | A | | 11/1993 | Romano | |
| 5,400,675 | A | | 3/1995 | Nagano | |
| 6,510,757 | B1 | * | 1/2003 | Wessel | 74/502.2 |
| 2007/0137388 | A1 | * | 6/2007 | Dal Pra | 74/502.2 |
| 2007/0137390 | A1 | | 6/2007 | Dal Pra' et al. | |
| 2007/0193497 | A1 | * | 8/2007 | Iteya et al. | 116/28.1 |

FOREIGN PATENT DOCUMENTS

| DE | 3136922 A1 | * | 3/1983 |
| EP | 1 739 001 A1 | | 1/2007 |
| EP | 2 174 862 A1 | | 4/2010 |
| FR | 2 705 079 | | 11/1994 |

OTHER PUBLICATIONS

European Search Report of corresponding EP Application No. 11 16 5074.3 dated Nov. 24, 2011.

* cited by examiner

Primary Examiner — Vicky Johnson
(74) Attorney, Agent, or Firm — Global IP Counselors, LLP (57) ABSTRACT A bicycle shift operating device basically comprises a bracket, a shift lever and a shift operating unit. The bracket includes a grip section having a lateral side with a shift cable guide portion. The lateral side faces towards a bicycle longitudinal center plane when the shift operating device is in an installed position. The shift lever is pivotally mounted to the bracket. The shift operating unit is mounted on the bracket. The shift operating unit includes a spool. The spool is rotated in a rotational plane in accordance with movement of the shift lever to wind a shift cable extending from the spool to the lateral side. The shift cable guide portion is arranged at the lateral side of the bracket such that the shift cable guide portion guides the shift cable along a guiding direction that is non-parallel to the rotational plane of the spool.

14 Claims, 13 Drawing Sheets

BICYCLE SHIFT OPERATING DEVICE

BACKGROUND

1. Field of the Invention

This invention generally relates to a bicycle shift operating device. More specifically, the present invention relates to a bicycle shift operating device that is mounted to a handlebar.

2. Background Information

Bicycle shift operating devices are used to shift gears of a multi-speed bicycle transmission. The multi-speed bicycle transmission typically includes a chain, one or more front sprockets or gears mounted to a front crankset and a plurality of rear sprockets or gears mounted to a rear hub of a rear wheel. The front and rear shift operating devices are designed to operate gearing mechanisms (e.g., a derailleur or an internal hub gear mechanism) to select a desired gear ratio. A pedaling force from the rider is transferred from the front sprockets to the rear sprockets via the chain for turning the rear wheel.

Typically, for example, road bicycles are provided with a pair of brake/shift operating devices for controlling brake devices and gear changing devices (e.g., a derailleur or an internal hub gear mechanism) to select a desired gear ratio. Generally, these brake/shift operating devices are mounted on the handlebar. Most mechanical brake/shift operating devices use control cables that connects the brake/shift operating devices to the brake devices for braking and the gear changing devices for changing gears. These control cables are typically Bowden type cables with an outer case and an inner wire.

For braking, a brake lever is provided that is pivotally mounted to a bracket of the brake/shift operating device. The inner wire of the brake cable is attached at one end to the brake lever and its other end is attached to the brake device. By rotating or pivoting the brake lever, the inner wire slides within the outer case to apply a pulling force that operates the brake device.

For shifting, a shift lever is usually used for operating the gear changing device. For example, the brake lever is also used as one of the shift lever for pulling the shift cable, while a separate lever is provided for releasing the shift cable. An operating force is typically applied by one of the rider's fingers to operate the shift levers, which in turn transmits the operating force to the shift cable via a shift operating unit. In many cases, the shift operating unit has a shift cable takeup spool. The inner wire of the shift cable is attached at one end to the cable takeup spool and its other end is attached to a part of a gear changing device such as a derailleur or an internal hub gear mechanism. The inner wire of the shift cable is wrapped or unwrapped about a peripheral edge of the shift cable takeup spool of the shift operating unit to pull and release the inner wire. By rotating the cable takeup spool, the inner wire slides within the outer case to pull or release the inner wire that operates the gear changing device. In the case of road shifters (e.g., brake/shift operating devices), the shift cable is typically routed along the handlebar. Examples of brake/shift operating devices are disclosed in U.S. Pat. No. 5,400,675 to Nagano (assigned to Shimano, Inc), U.S. Pat. No. 5,257,683 to Romano (assigned to Campagnolo) and U.S. Publication Patent No. 2007-0012137 to Dal Pra' (assigned to Campagnolo).

SUMMARY

One aspect of the present disclosure is to provide a bicycle shift operating device that is provided with a bracket having a shift cable guide along a lateral side of a grip section of the bracket.

In view of the state of the known technology, a bicycle shift operating device is disclosed that basically comprises a bracket, a shift lever and a shift operating unit. The bracket includes a grip section having a lateral side with a shift cable guide portion. The lateral side faces towards a bicycle longitudinal center plane when the shift operating device is in an installed position. The shift lever is pivotally mounted to the bracket. The shift operating unit is mounted on the bracket. The shift operating unit includes a spool. The spool is rotated in a rotational plane in accordance with movement of the shift lever to wind a shift cable extending from the spool to the lateral side. The shift cable guide portion is arranged at the lateral side of the bracket such that the shift cable guide portion guides the shift cable along a guiding direction that is non-parallel to the rotational plane of the spool.

Various objects, features, aspects and advantages of the present disclosure will become apparent to those skilled in the art from the following detailed description, which, taken in conjunction with the annexed drawings, discloses one embodiment of a bicycle shift operating device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
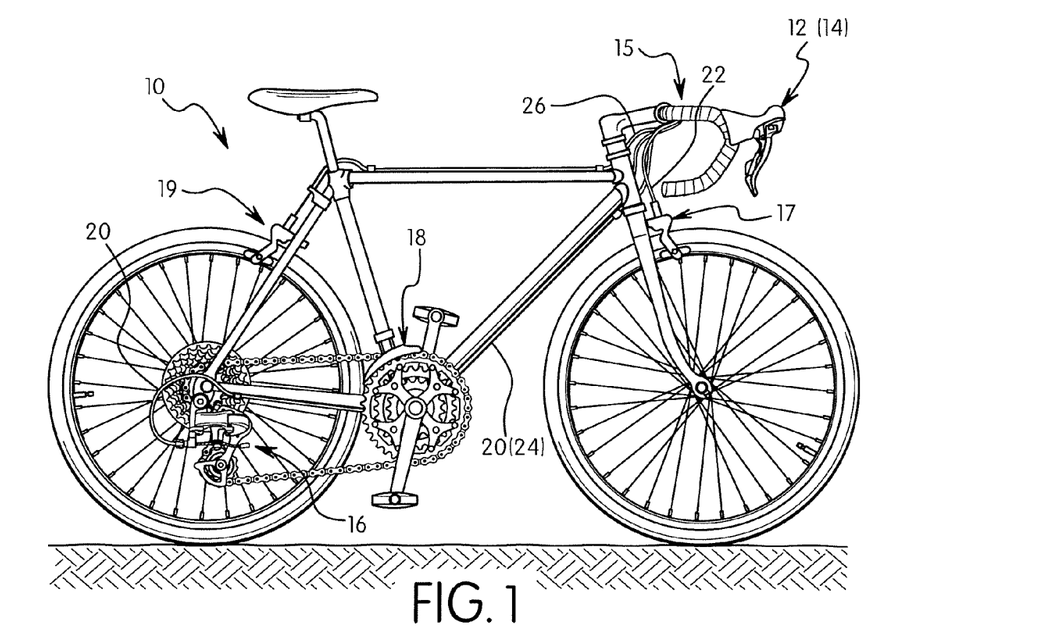
FIG. 1 is a side elevational view of a bicycle equipped with a pair of bicycle shift operating devices coupled to a drop type handlebar in accordance with one embodiment.
Figure 2:
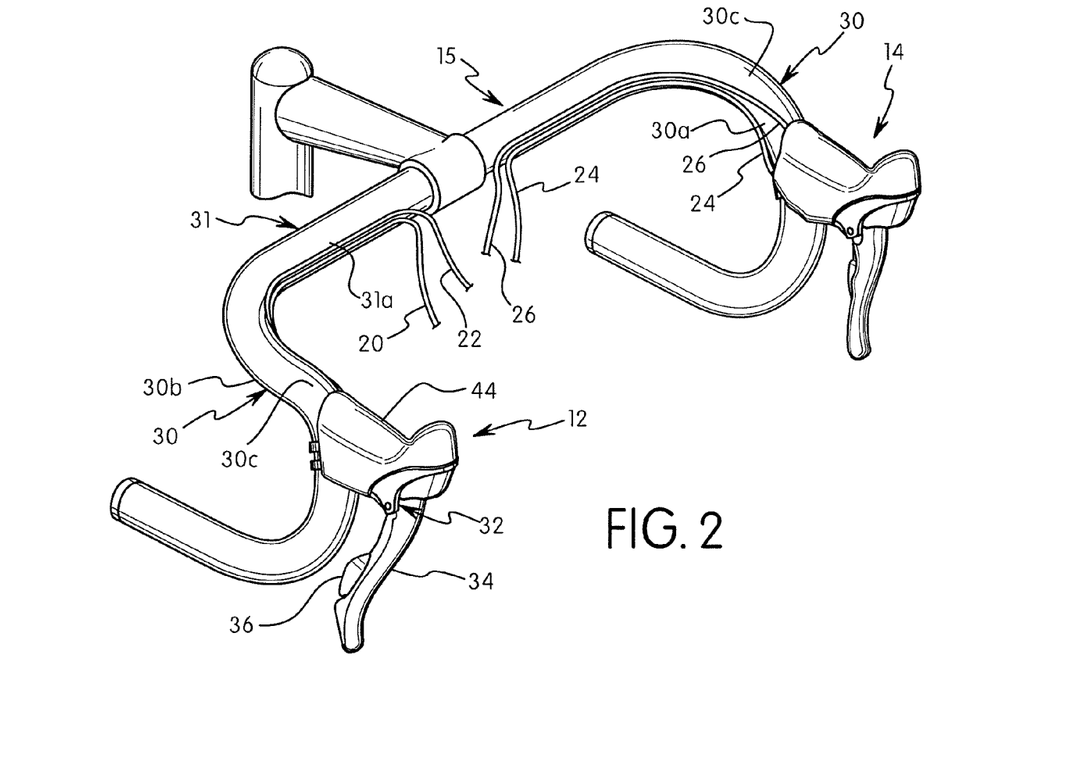
FIG. 2 is a front perspective view of the drop type handlebar and the bicycle shift operating devices illustrated in FIG. 1 with the bicycle shift operating devices in their installed positions.

Referring initially to FIGS. 1 and 2, a bicycle 10 is illustrated with a pair of bicycle shift operating devices 12 and 14 mounted on a drop down handlebar 15 in accordance with one embodiment. The bicycle shift operating device 12 is a right hand side control device operated by the rider's right hand to operate a rear derailleur 16 and a front brake device 17, while the bicycle shift operating device 14 is a left hand side control device operated by the rider's left hand to operate a front derailleur 18 and a rear brake device 19. In the illustrated embodiment, the bicycle shift operating device 12 is operatively coupled to the rear derailleur 16 via a shift control cable 20 and the front brake device 17 via a brake control cable 22. The bicycle shift operating device 14 is operatively coupled to the front derailleur 18 via a shift control cable 24 and the rear brake device 19 via a brake control cable 26. However, the right and left hand side bicycle shift operating devices 12 and 14 are not limited to this arrangement. For example, the bicycle shift operating device 12 can be configured to operate the front derailleur 18 and the bicycle shift operating device 14 can be configured to operate the rear derailleur 16, as needed and/or desired. Also, the control cables 24 and 26 can be changed so that the bicycle shift operating device 12 operates the rear brake device 19 and the bicycle shift operating device 14 operates the front brake device 17, as needed and/or desired.

Figure 9:
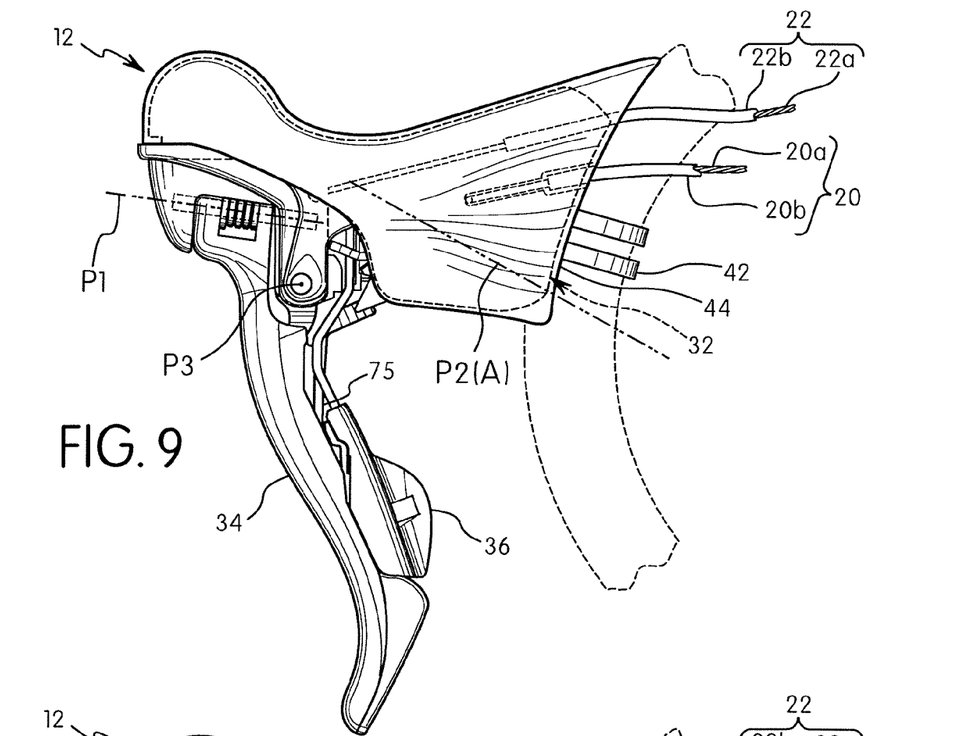
FIG. 9 is an inside elevational view of a portion of the drop type handlebar and the right hand side shift operating device illustrated in FIGS. 1 to 7 with the right hand side shift operating device in the rest position.
Figure 10:
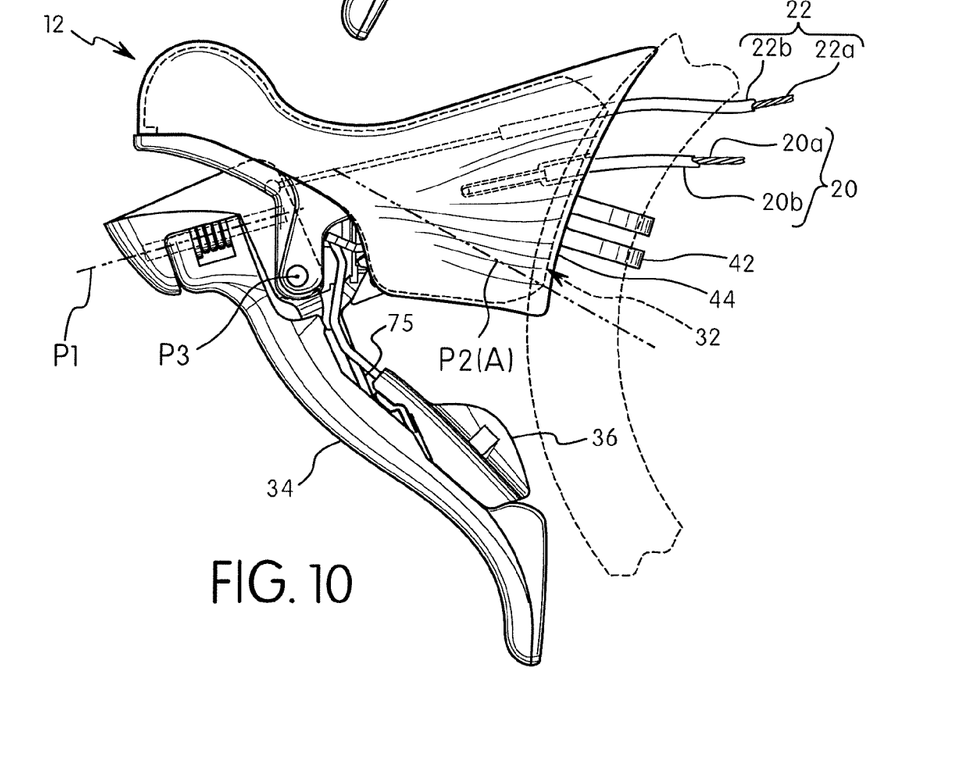
FIG. 10 is an inside elevational view of the portion of the drop type handlebar and the right hand side shift operating device illustrated in FIG. 9 with the brake/shift lever of the right hand side shift operating device moved to a braking position.

Preferably, the control cables 20, 22, 24 and 26 are conventional bicycle operating cables that have an outer case covering an inner wire. In other words, each of the control cables 20, 22, 24 and 26 are Bowden type cables basically include an inner wire slidably received within an outer case. For example, as seen in FIGS. 9 and 10, the shift control cable 20 has an inner wire 20a with an outer case 20b covering the inner wire 20a, while the brake control cable 22 has an inner wire 22a with an outer case 22b covering the inner wire 22a.

In the illustrated embodiment, the right and left hand side bicycle shift operating devices 12 and 14 are essentially identical in operation, except that they are mirror images of each other and they have a different number of shift operations. In other words, the left hand side bicycle shift operating device 14 is substantially identical to the right hand side bicycle shift operating device 12, except for the shifting unit (not shown) of the left hand side bicycle shift operating device 14 has been modified to be a mirror image and to decrease the number of gears that can be shifted. Thus, only the right hand side bicycle shift operating device 12 will be discussed and illustrated herein.

As seen in FIGS. 2 to 8, the bar tape has been removed from the drop down handlebar 15 to show the routing the control cables 20, 22, 24 and 26. Normally, the gripping portions of the drop down handlebar 15 and portions of the control cables 20 and 22 are covered by the bar tape as seen in FIG. 1. The drop down handlebar 15 has a pair of downwardly curved portions 30 and a straight cross portion 31 connecting upper ends of the downwardly curved portions 30. Each of the downwardly curved portions 30 of the drop down handlebar 15 includes an interior side surface 30a, an exterior side surface 30b and a top surface 30c. The straight cross portion 31 of the drop down handlebar 15 includes a front facing surface 31a. The control cables 20 and 22 are routed along the interior side surface 30a and the front facing surface 31a of the drop down handlebar 15. In other words, as discussed below, the control cables 20 and 22 exit the bicycle shift operating device 12 such that the control cables 20 and 22 are routed along the interior side surface 30a of the drop down handlebar 15. In this way, the control cables 20 and 22 are not routed along a top surface 30c of the curved portion 30 of the drop down handlebar 15. The control cables 24 and 26 are routed from the bicycle shift operating device 14 along the drop down handlebar 15 in the same manner as the control cables 20 and 22.

Figure 3:
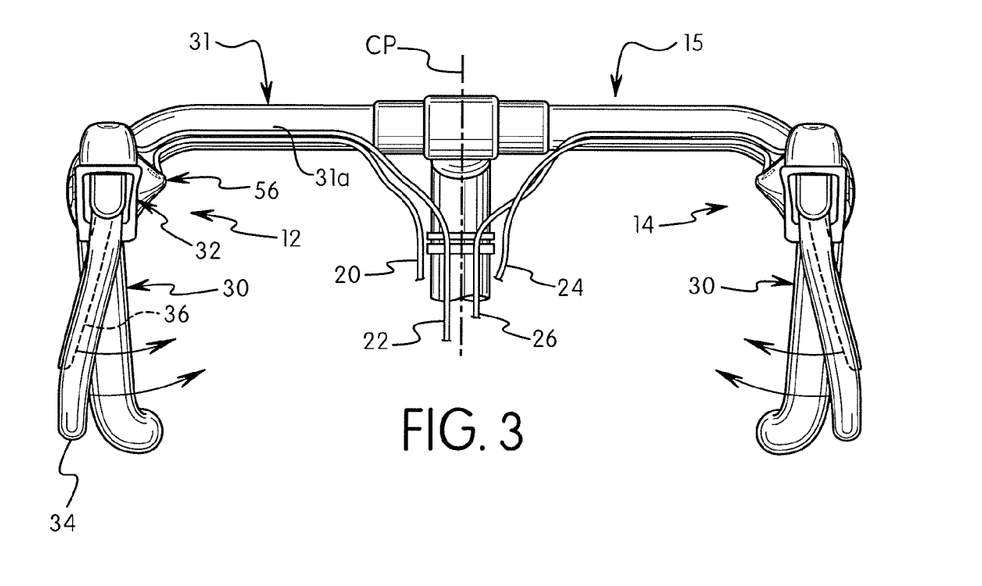
FIG. 3 is a front elevational view of the drop type handlebar and the bicycle shift operating devices illustrated in FIGS. 1 and 2 with the bicycle shift operating devices in their installed positions.
Figure 4:
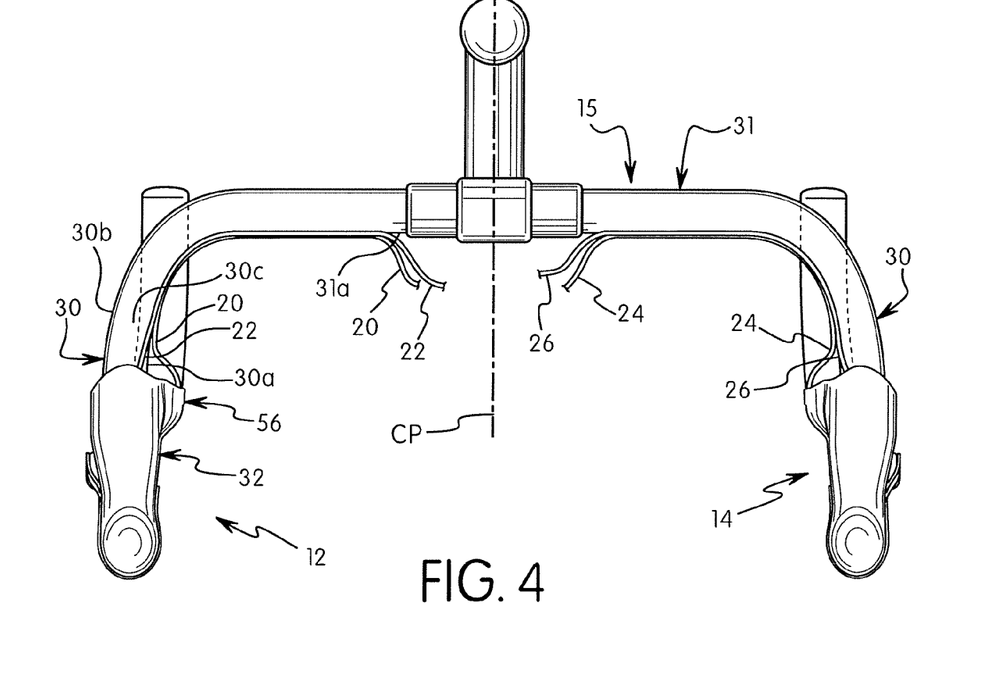
FIG. 4 is a top plan view of the drop type handlebar and the bicycle shift operating devices illustrated in FIGS. 1 to 3 with the bicycle shift operating devices in their installed positions.
Figure 5:
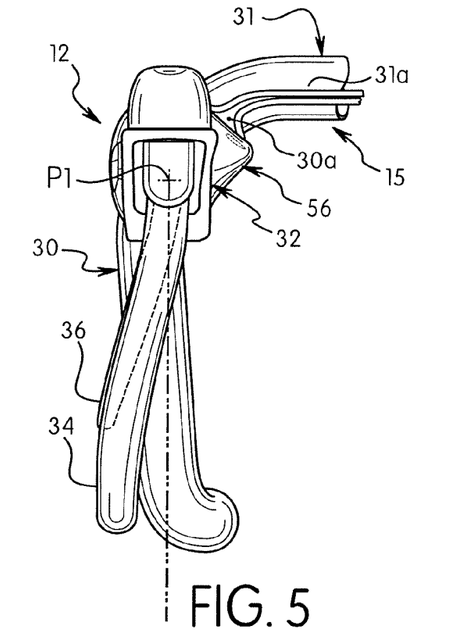
FIG. 5 is a front elevational view of a portion of the drop type handlebar and the right hand side shift operating device illustrated in FIGS. 1 to 4 with the right hand side shift operating device in the rest position.

As seen in FIGS. 3 and 4, the bicycle shift operating device 12 includes a bracket or base member 32 is attached to the curved portion of the drop down handlebar 15. Riders sometimes grip the bracket 32 or the handlebar 15 and lean on the bracket 32 or the handlebar 15 during riding. Thus, it's desirable to provide a comfortable feeling for the rider's hand while the rider is gripping the bracket 32 or the handlebar 15. Accordingly, the bicycle shift operating device 12 provides for convenient routing of the cables 20 and 22 to avoid an uncomfortable feeling for the rider while the rider is gripping the bracket 32 and the handlebar 15 respectively.

Figure 11:
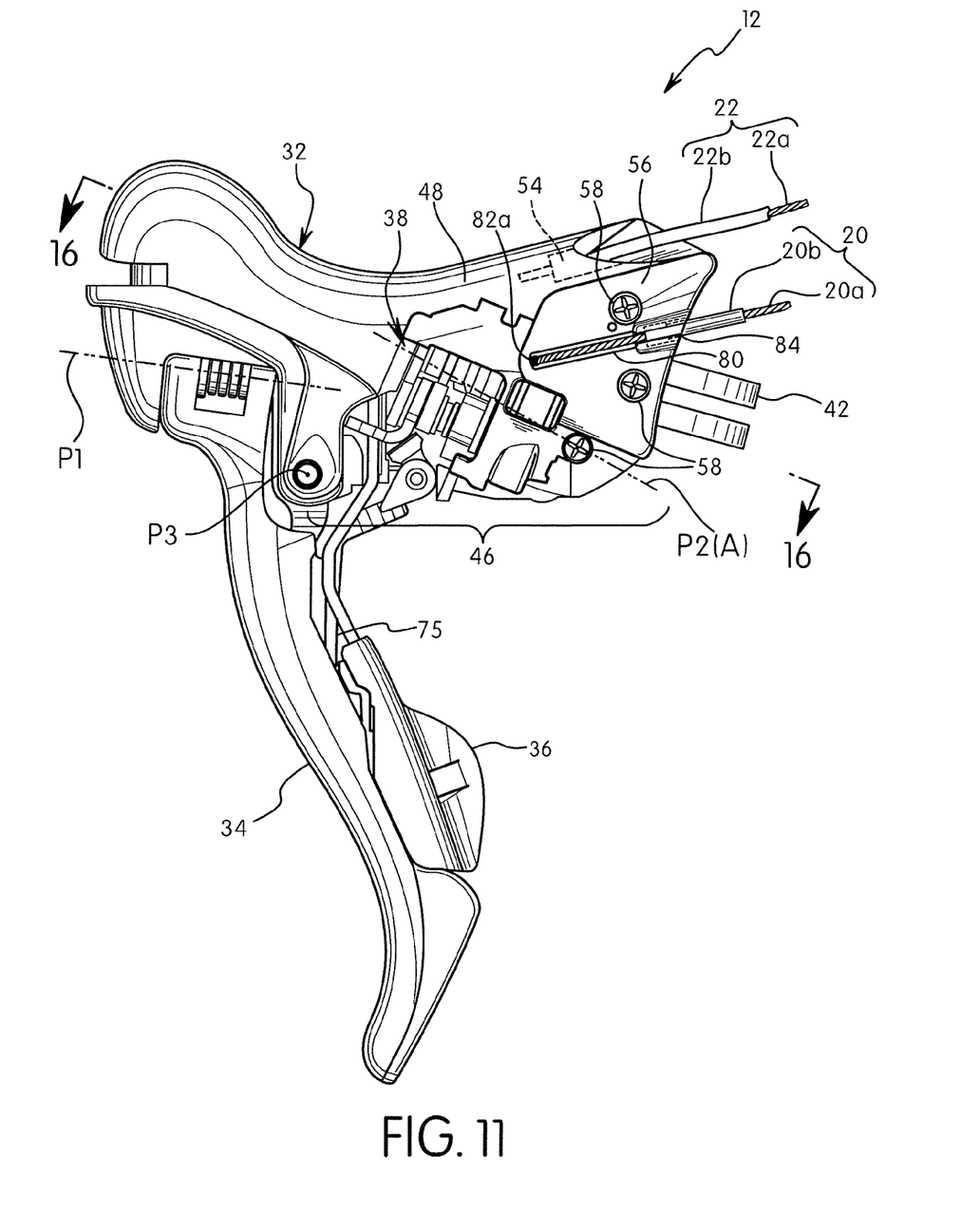
FIG. 11 is an enlarged inside elevational view of the right hand side shift operating device illustrated in FIGS. 1 to 9 with the right hand side shift operating device in the rest position and the grip cover removed.

In this embodiment, the bicycle shift operating device 12 further includes a brake/shift lever 34, a shift lever 36 and a shift operating unit 38 (FIG. 11). The brake/shift lever 34 is used to perform braking operations of the front brake 17. The brake/shift lever 34 and the shift lever 36 are operatively coupled to the shift operating unit 38 for performing shifting operations that moves a chain guide of the rear derailleur 16 to shift the chain and changes gears. The brake/shift lever 34 and the shift lever 36 both pivot relative to the bracket 32 in a direction towards a bicycle longitudinal center plane CP for performing a shifting operation.

Referring to FIGS. 5 to 8, shifting operations of the brake/shift lever 34 and the shift lever 36 are illustrated. The brake/shift lever 34 and the shift lever 36 are shown in their rest positions in FIG. 5. The brake/shift lever 34 and the shift lever 36 are biased to the rest positions in a conventional manner. The brake/shift lever 34 functions as a cable winding lever that pulls the inner wire 20a into the shift operating unit 38, while the shift lever 36 functions as a cable releasing lever that releases the inner wire 20a from shift operating unit 38.

Figure 6:
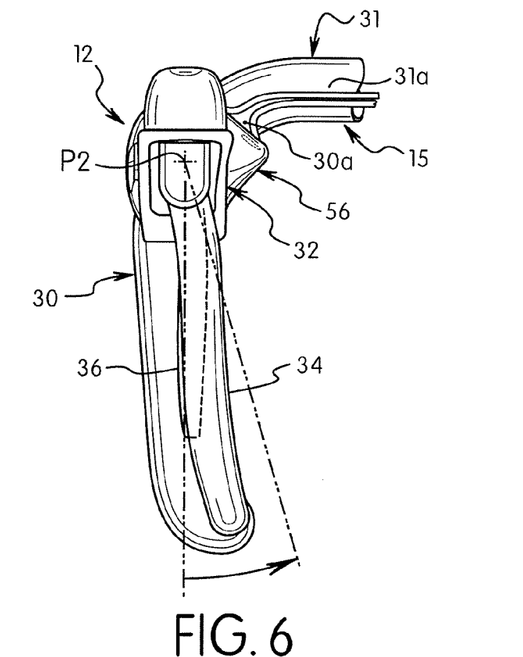
FIG. 6 is a front elevational view of the portion of the drop type handlebar and the right hand side shift operating device illustrated in FIG. 5 with the brake/shift lever of the right hand side shift operating device moved to a first cable winding position.
Figure 7:
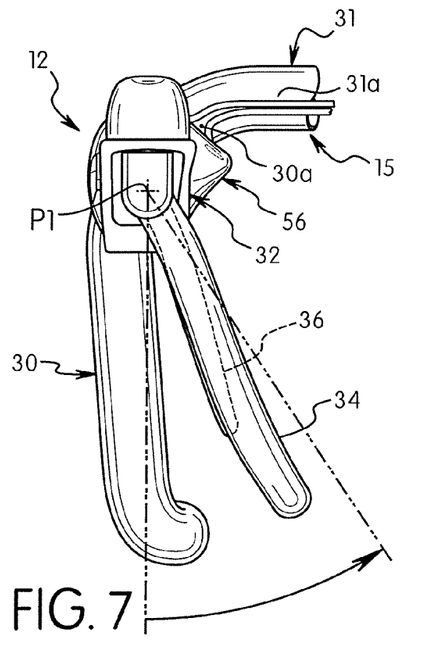
FIG. 7 is a front elevational view of the portion of the drop type handlebar and the right hand side shift operating device illustrated in FIGS. 5 and 6 with the brake/shift lever of the right hand side shift operating device moved to a second cable winding position.

In performing a shifting (winding) operation with the brake/shift lever 34, as seen in FIG. 6, the brake/shift lever 34 is moved (pivoted) laterally inward about a shift pivot axis P1 from the rest position (FIG. 5) to either a first cable winding position (FIG. 6) to perform a single gear shift operation or a second cable releasing position (FIG. 7) to perform a two gear shift operation in a single progressive movement. In this illustrated embodiment, when the brake/shift lever 34 is moved to perform a shifting operation, the shift lever 36 moves with the brake/shift lever 34.

Figure 8:
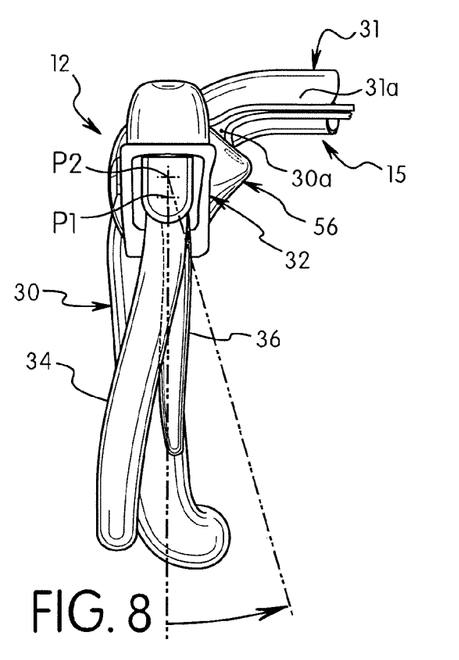
FIG. 8 is a front elevational view of the portion of the drop type handlebar and the right hand side shift operating device illustrated in FIGS. 5 to 7 with the shift (release) lever of the right hand side shift operating device moved to a cable releasing position.

In performing a shifting (releasing) operation with the shift lever 36, as seen in FIG. 8, the shift lever 36 is moved laterally inward about a shift pivot axis P2 from the rest position (FIG. 5) to a cable releasing position (FIG. 8) to perform a gear shift operation. In this illustrated embodiment, when the shift lever 36 is moved to perform a shifting operation, the brake/shift lever 34 does not move with the shift lever 36. Rather during performing a shifting operation with the shift lever 36, the brake/shift lever 34 basically remains in its rest position.

Generally speaking, in performing shifting operations, the brake/shift lever 34 and the shift lever 36 both move in a lateral direction with respect to the bracket 32 along shift operating planes to operate the shift operating unit 38. While in this illustrated embodiment, the shift pivot axes P1 and P2 are not coincident (offset), the shift pivot axes P1 and P2 could be made to be coincident if needed and/or desired. Moreover, the shift operating unit 38 can be operated in a variety of different ways, if needed and/or desired. For example, the shift operating unit 38 could be operated with buttons instead of levers. Also, the shift operating unit 38 could be replaced with a shift operating unit that is operated by a single shift lever to perform both winding and releasing operations.

Referring to FIGS. 9 and 10, the brake/shift lever 34 is also pivotally mounted to the bracket 32 to perform a braking operation. The brake/shift lever 34 includes a brake cable attachment member (not shown) for attaching the inner wire 22a. When the brake/shift lever 34 is pivoted about a brake pivot axis P3, the brake/shift lever 34 pulls the inner wire 22a relative to the outer case 22b to perform a braking operation with the front brake 17. Generally speaking, in performing braking operations, the brake/shift lever 34 moves in a longitudinal direction with respect to the bracket 32. In other words, during a braking operation, the brake/shift lever 34 moves along a brake operating plane that is substantially perpendicular the shift operating planes of the brake/shift lever 34 and the shift lever 36. Thus, the brake/shift lever 34 moves with respect to the bracket 32 about the brake pivot axis P3 that is perpendicular to the shift pivot axis P1 such that movement of the brake/shift lever 34 moves the brake cable attachment member relative to the bracket 32.

Referring now to FIGS. 11 to 16, the bracket 32 of the bicycle shift operating device 12 will now be discussed in more detail. Basically, as discussed below, the bracket 32 is configured and arranged so that the shift control cable 20 projects out of the bracket 32 towards the bicycle longitudinal center plane CP of the bicycle 10, and then the bracket 32 guides the shift control cable 20 rearward towards handlebar 15 when the shift operating device 12 is in an installed position. In this way, the shift control cable 20 can be easily routed along the interior side surface 30a and the front facing surface 31a of the handlebar 15.

The bracket 32 is a stationary member when mounted to the handlebar 15. The bracket 32 houses the shift operating unit 38, with the brake/shift lever 34 and the shift lever 36 being movable with respect to the bracket 32 to operate the shift operating unit 38. While the bicycle shift operating device 12 has two shift levers for operating the shift operating unit 38, the bracket 32 and the shift operating unit 38 can be reconfigured to operate with a single shift lever if needed and/or desired.

The bracket 32 is provided with handlebar mounting structure 42. Further, the bracket 32 is basically covered by an outer elastomeric cover 44. The bracket 32 is fixedly mounted to the handlebar 15 by the handlebar mounting structure 42. The handlebar mounting structure 42 is preferably a conventional band clamp or similar structure that is used in a road shifter for mounting to a drop down style handlebar such as the drop down handlebar 15 shown in FIGS. 1 to 3. Thus, the handlebar mounting structure 42 will not be discussed in detail herein.

Figure 12:
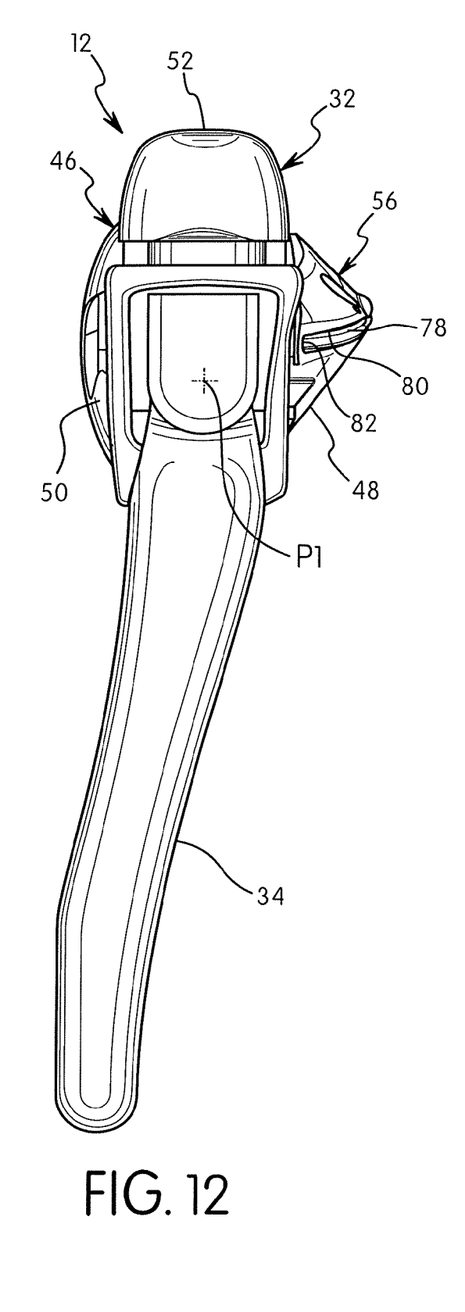
FIG. 12 is an enlarged front elevational view of the right hand side shift operating device illustrated in FIG. 11 with the right hand side shift operating device in the rest position and the grip cover removed.
Figure 13:
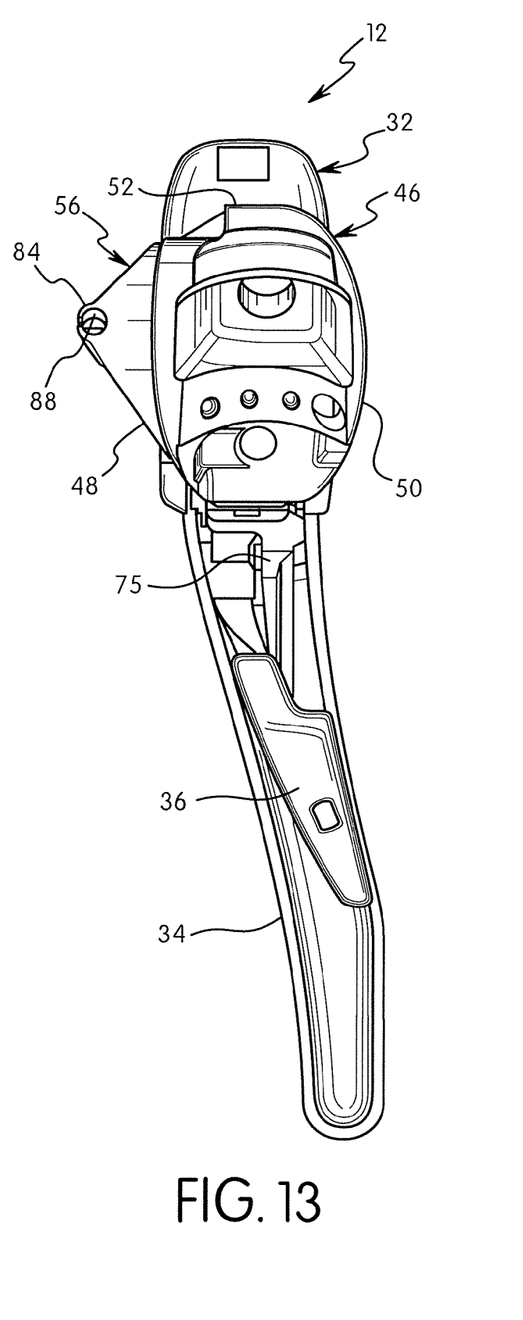
FIG. 13 is an enlarged rear elevational view of the right hand side shift operating device illustrated in FIGS. 11 and 12 with the right hand side shift operating device in the rest position and the grip cover removed.
Figure 14:
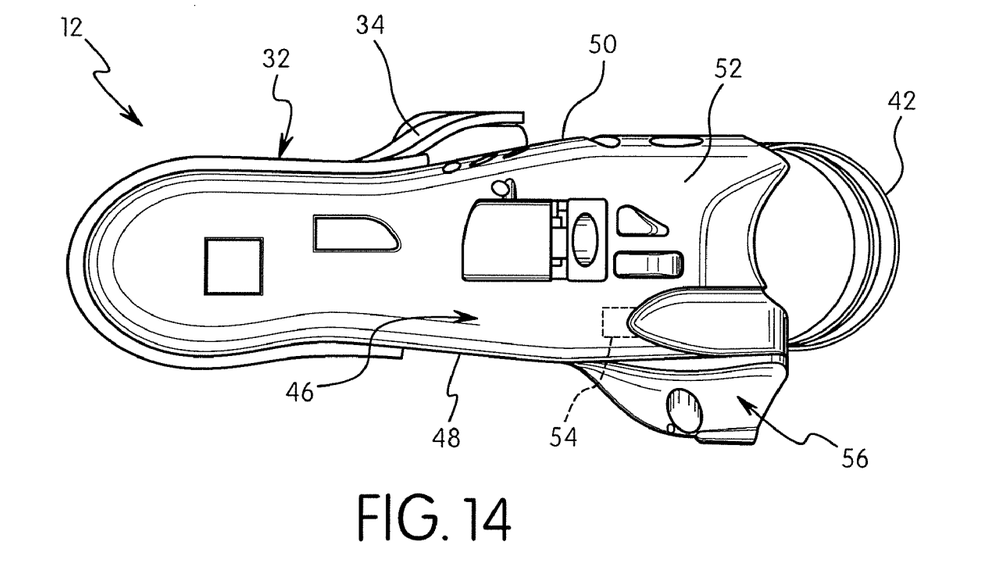
FIG. 14 is an enlarged top plan view of the right hand side shift operating device illustrated in FIGS. 11 to 13 with the right hand side shift operating device in the rest position and the grip cover removed.
Figure 15:
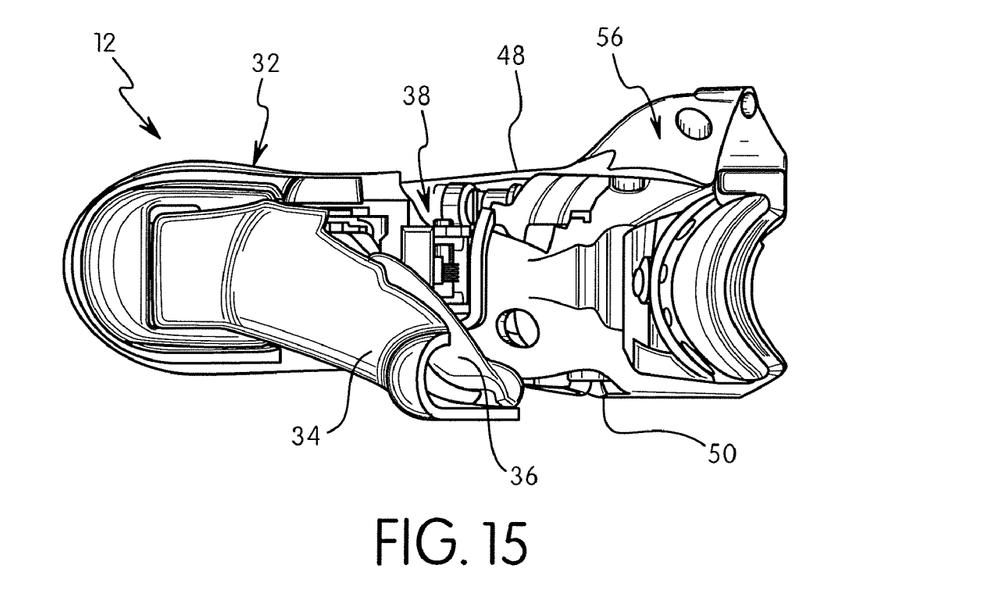
FIG. 15 is an enlarged bottom plan view of the right hand side shift operating device illustrated in FIGS. 11 to 14 with the right hand side shift operating device in the rest position and the grip cover removed.

As best seen in FIG. 11, the bracket 32 includes a grip section 46 for the rider to grip the bracket 32 during riding. The grip section 46 is defined as the portion of the bracket 32 that is located between the brake pivot axis P3 and the rear edge of the bracket 32 where the handlebar mounting structure 42 is located. The brake/shift lever 34 and the shift lever 36 are provided at a front end of the grip section 46 of the bracket 32, while the handlebar mounting structure 42 is provided at a rear end of the grip section 46 of the bracket 32. As best seen in FIGS. 12 to 14, the grip section 46 of the bracket 32 has an inner lateral side 48 and an outer lateral side 50. As best seen in FIGS. 13 and 14, the grip section 46 of the bracket 32 also includes an upper or top side 52 that extends between the lateral sides 48 and 50. The upper side 52 of the grip section 46 of the bracket 32 is provided with a brake cable guide portion 54. The brake cable guide portion 54 guides the brake cable 22 near the outer (opposite) lateral side 50 of the grip section 46 that is opposed to the inner lateral side 48.

The inner lateral side 48 faces towards the bicycle longitudinal center plane CP when the shift operating device 12 is in an installed position, while the outer lateral side 50 faces away from the bicycle longitudinal center plane CP when the shift operating device 12 is in an installed position. The inner lateral side 48 of the grip section 46 of the bracket 32 is provided with a shift cable guide portion 56. The brake cable guide portion 54 is disposed closer to the outer (opposite) lateral side 50 of the grip section 46 than the shift cable guide portion 56 of the inner lateral side 48 of the grip section 46. In this way, both the shift cable 20 and the brake cable 22 can be routed along the interior side surface 30a and the front facing surface 31a of the handlebar 15 rather than along the top surface 30c of the handlebar 15.

The shift cable guide portion 56 is a removable member that is attached on the inner lateral side 48 of the grip section 46 by three screws 58 (FIG. 11). In other words, the shift cable guide portion 56 is detachable from the rest of the grip section 46 in a reinstallable manner. The shift cable guide portion 56 protrudes towards the bicycle longitudinal center plane CP when the shift operating device 12 is in an installed position as seen in FIGS. 3 and 4. The shift cable guide portion 56 is provided such that the shift cable 20 is guided by the shift cable guide portion 56 to a position adjacent the handlebar mounting structure 42, but spaced inwardly towards the bicycle longitudinal center plane CP.

Figure 16:
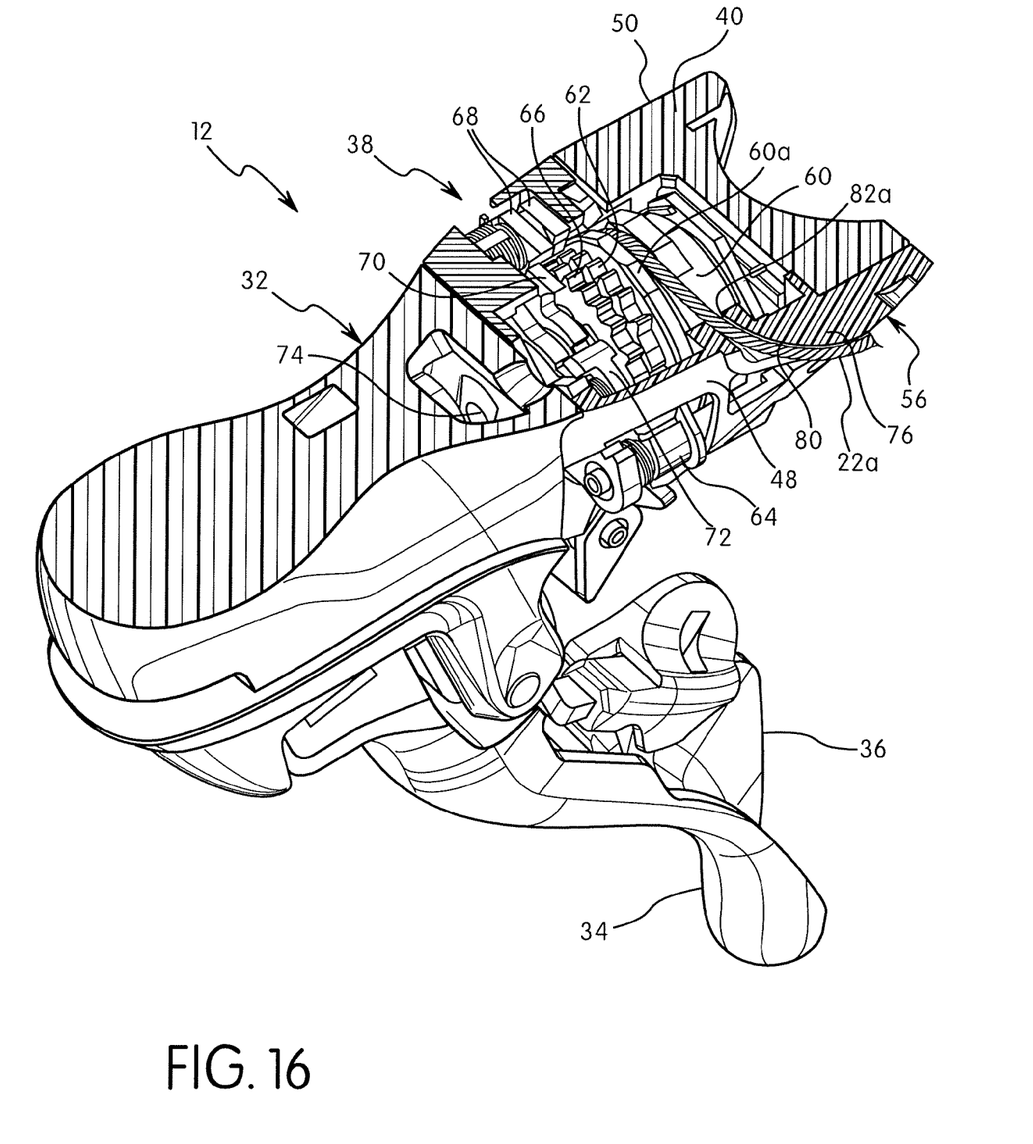
FIG. 16 is an enlarged cross sectional view of the right hand side shift operating device illustrated in FIGS. 11 to 15 as seen along section line 16-16 of FIG. 11.
Figure 17:
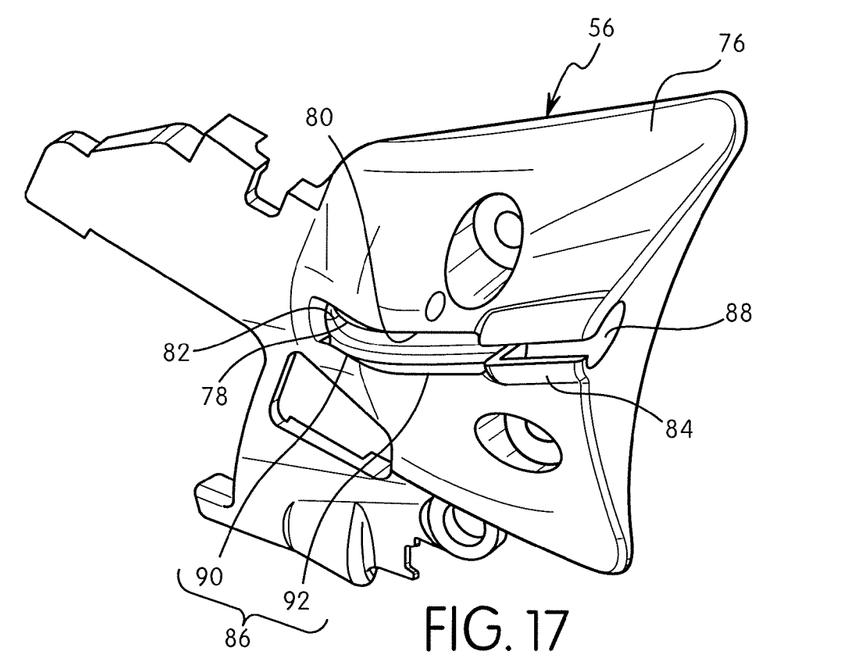
FIG. 17 is an enlarged inside perspective view of the shift cable guide portion for the right hand side shift operating device illustrated in FIGS. 11 to 16.
Figure 18:
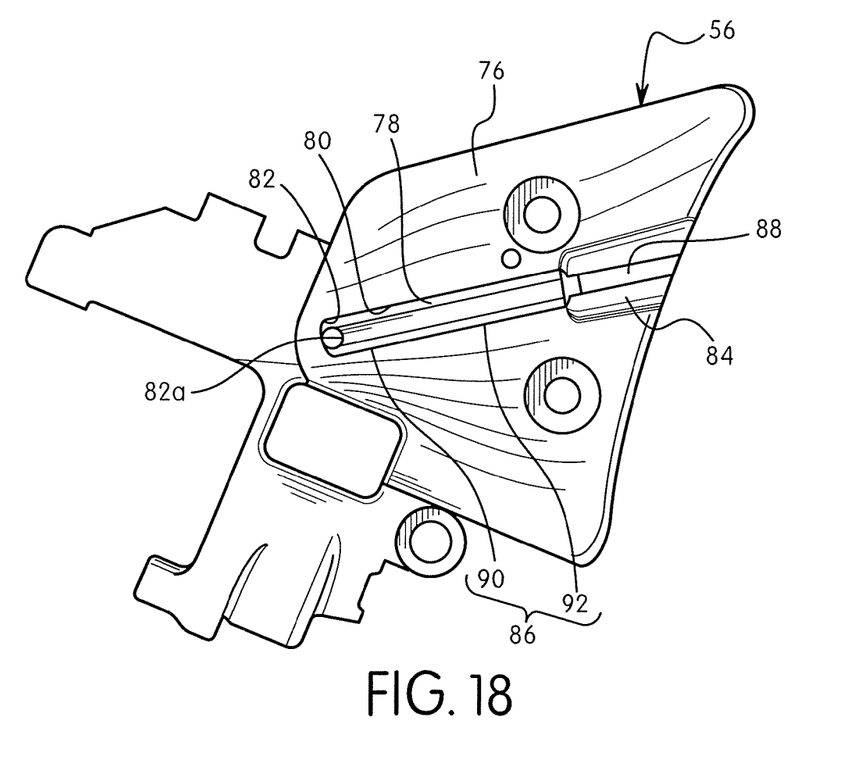
FIG. 18 is an enlarged inside elevational view of the shift cable guide portion illustrated in FIG. 17.
Figure 19:
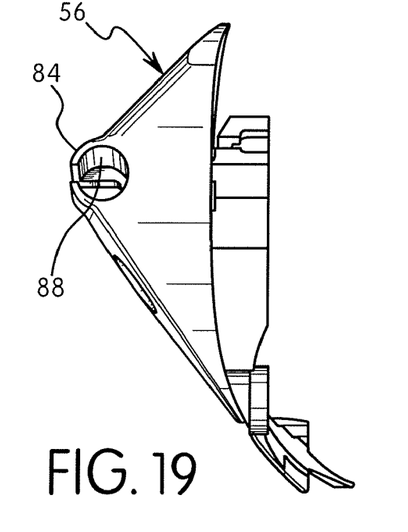
FIG. 19 is an enlarged rear elevational view of the shift cable guide portion illustrated in FIGS. 17 and 18.
Figure 20:
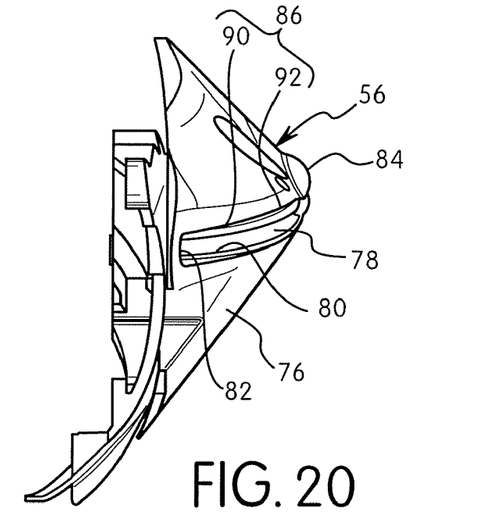
FIG. 20 is an enlarged front elevational view of the shift cable guide portion illustrated in FIGS. 17 to 19.
Figure 21:
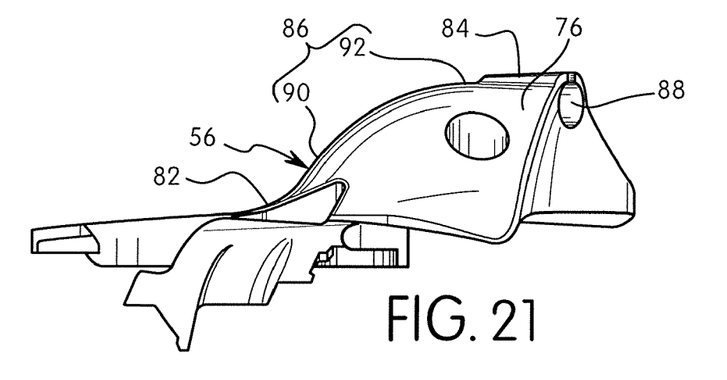
FIG. 21 is an enlarged bottom plan view of the shift cable guide portion illustrated in FIGS. 17 to 20.
Figure 22:
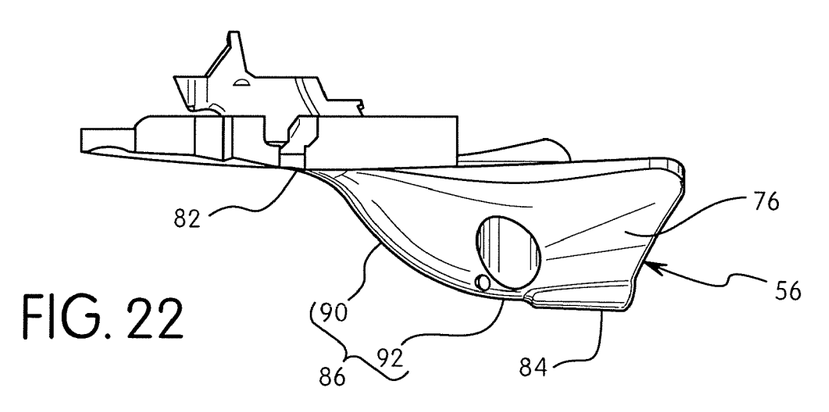
FIG. 22 is an enlarged top plan view of the shift cable guide portion illustrated in FIGS. 17 to 21.
Figure 23:
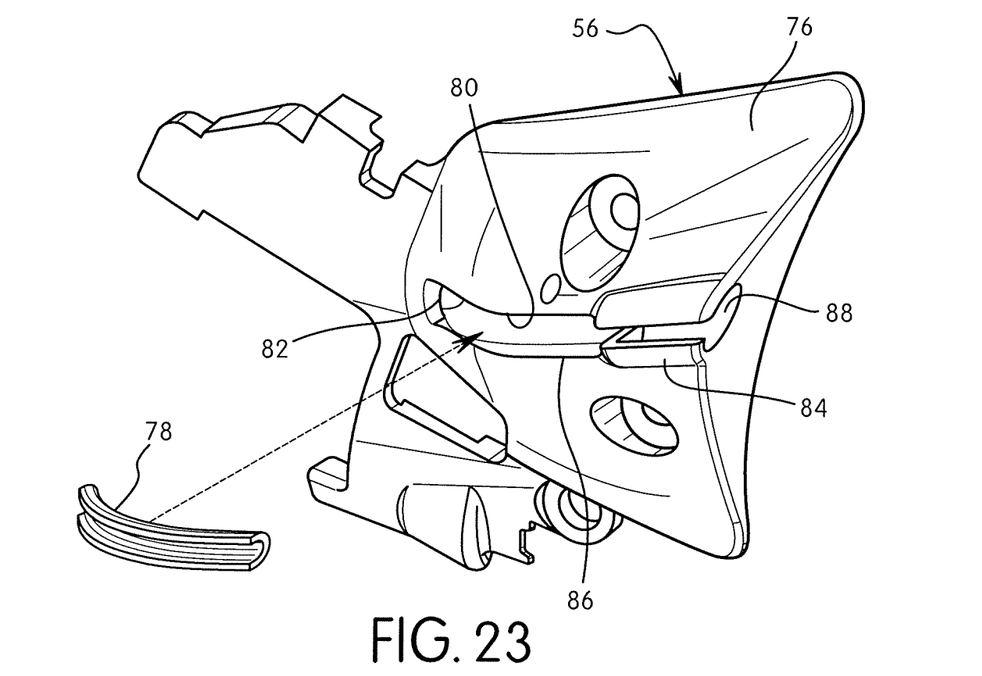
FIG. 23 is an enlarged inside perspective view, similar to FIG. 17, of the shift cable guide portion illustrated in FIGS. 17 to 22, but with the guide insert exploded way.
Figure 24:
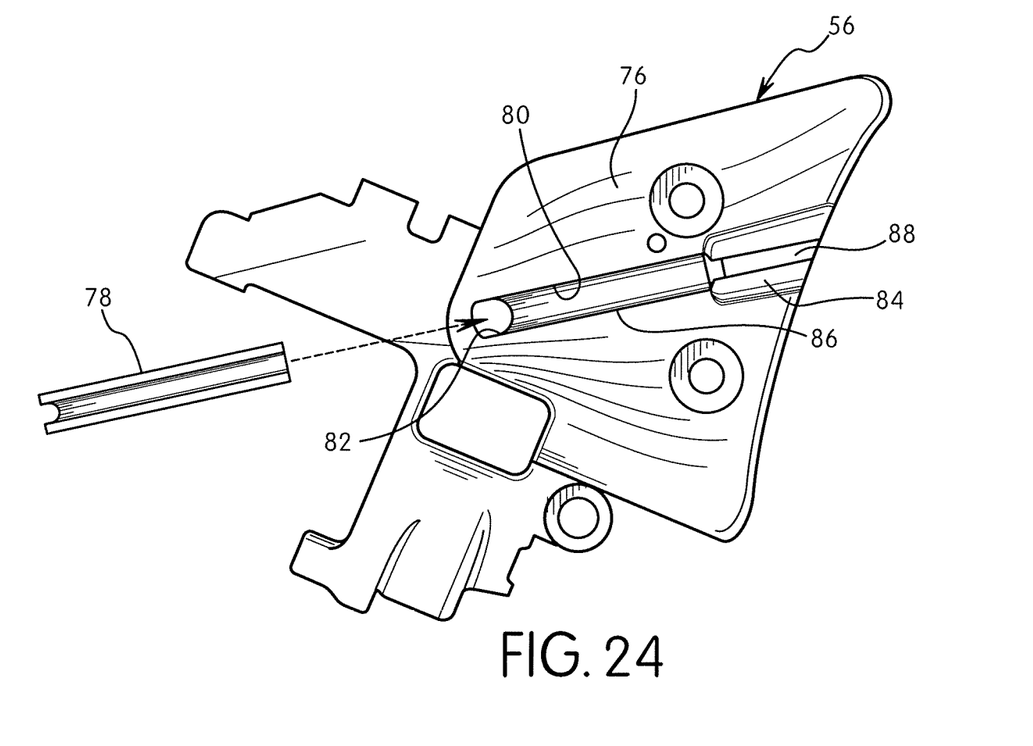
FIG. 24 is an enlarged inside elevational view, similar to FIG. 18, of the shift cable guide portion illustrated in FIGS. 17 to 23, but with the guide insert exploded way.
Figure 25:
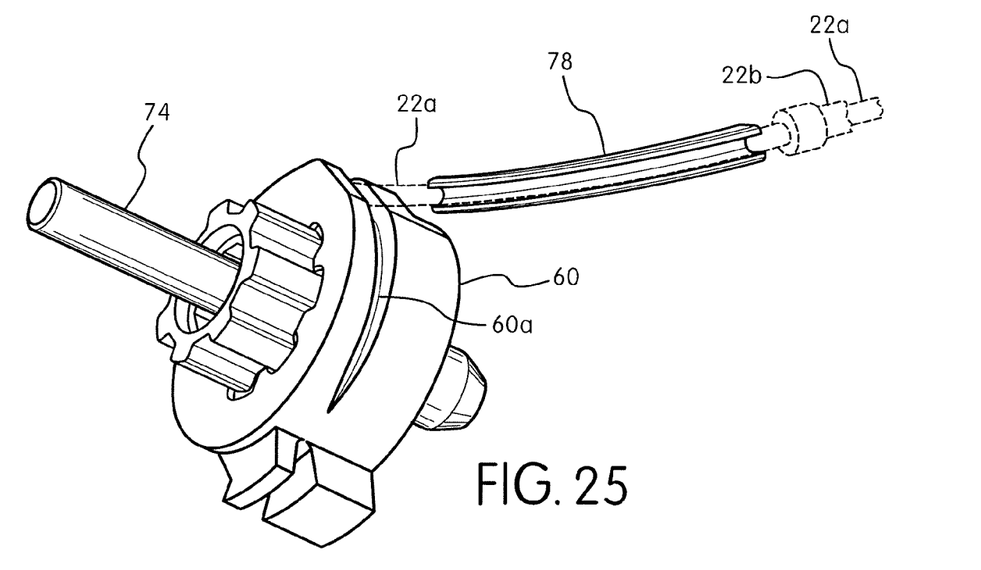
FIG. 25 is a inside perspective view of the cable takeup spool and the guide insert to show the inner wire path of the shift cable.
Figure 26:
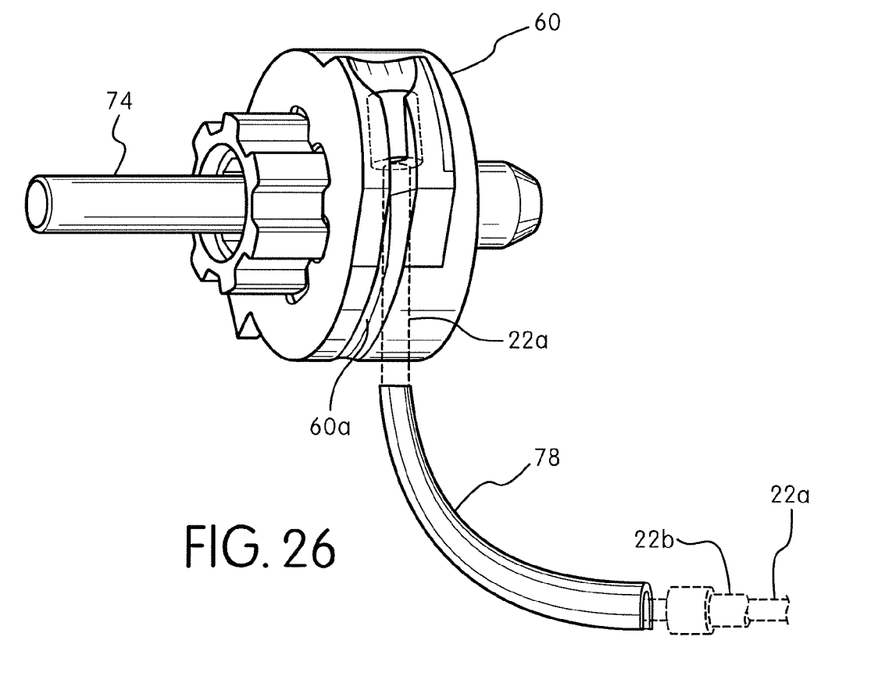
FIG. 26 is a top perspective view of the cable takeup spool and the guide insert illustrated in FIG. 25 further showing the inner wire path of the shift cable.

Turning now to FIG. 16, the shift operating unit 38 will now be discussed. As seen in FIG. 16, the shift operating unit 38 is mounted on the bracket 32. The shift operating unit 38 basically includes a cable takeup spool 60, a winding plate 62, a winding pawl 64, a positioning plate 66, a pair of positioning pawls 68, a release plate 70 and a release pawl 72. A shift axle 74 supports the cable takeup spool 60, the winding plate 62 and the positioning plate 66 to the bracket 32 for rotation on an axis A (FIG. 11), which is coincident with the shift axis P2 in this embodiment, in that the shift lever 36 is mounted on the shift axle 74.

As seen in FIGS. 9 to 10, the shift operating unit 38 also has a connecting member 75 that connects the brake/shift lever 34 to the shift operating unit 38. In this way, the brake/shift lever 34 is operatively coupled to the shift operating unit 38 to perform a winding operation of the cable takeup spool 60. The connecting member 75 is pivotally mounted at one end to the shift axle 74 and slidably engaged with the brake/shift lever 34 at the other end. The connecting member 75 has a hinge (not shown) between its ends so that the lower part of the connecting member 75 can pivot in a rearward direction when the brake/shift lever 34 is pivoted in the rearward direction to perform a braking operation. The winding pawl 64 is mounted on the connecting member 75. In this way, pivotal movement of the brake/shift lever 34 about the shift pivot axis P1 in a lateral inward direction towards the bicycle longitudinal center plane CP causes the connecting member 75 to move with the brake/shift lever 34 and the winding pawl 64 to engage the winding plate 62. This engagement of the winding pawl 64 with the winding plate 62 causes the cable takeup spool 60 to rotate with the winding plate 62 as the brake/shift lever 34 is pivoted about the shift pivot axis P1, since the winding plate 62 and the cable takeup spool 60 are fixed together.

The release pawl 72 is mounted on the shift lever 36 to move with the shift lever 36. In this way, pivotal movement of the shift lever 36 about the shift pivot axis P2 in a lateral inward direction towards the bicycle longitudinal center plane CP causes the release pawl 72 to engage the release plate 70. This engagement of the release pawl 72 with the release plate 70 causes the positioning pawls 68 to release the winding plate 62 and the positioning plate 66 such that the cable takeup spool 60 can freely rotate in a cable releasing direction.

Figure 27:
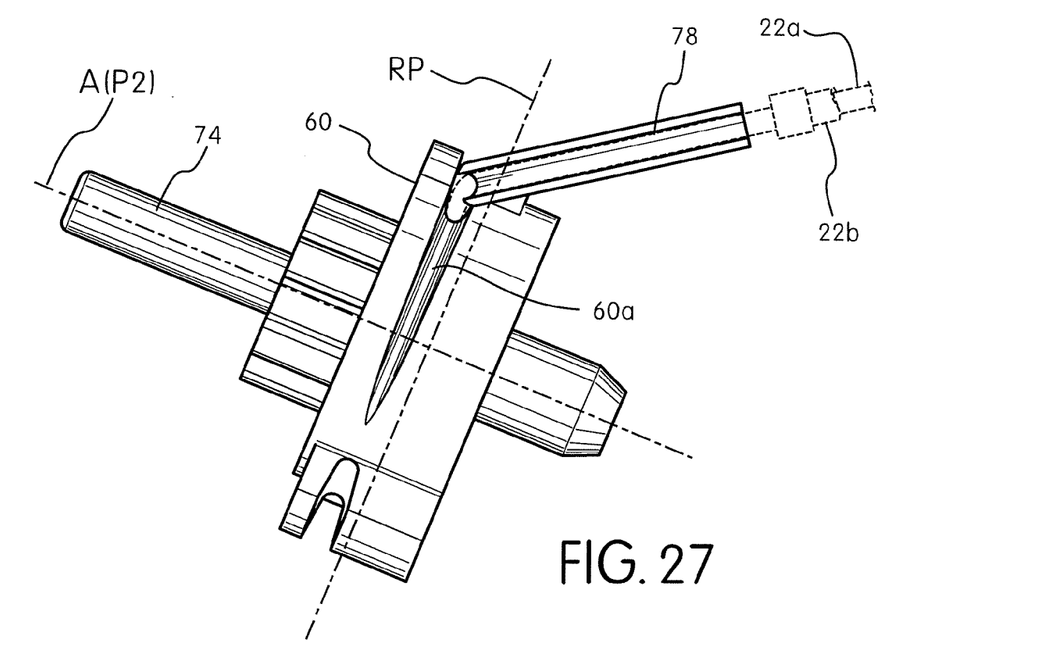
FIG. 27 is an inside elevational view of the cable takeup spool and the guide insert illustrated in FIGS. 25 and 26 further showing the inner wire path of the shift cable.
Figure 28:
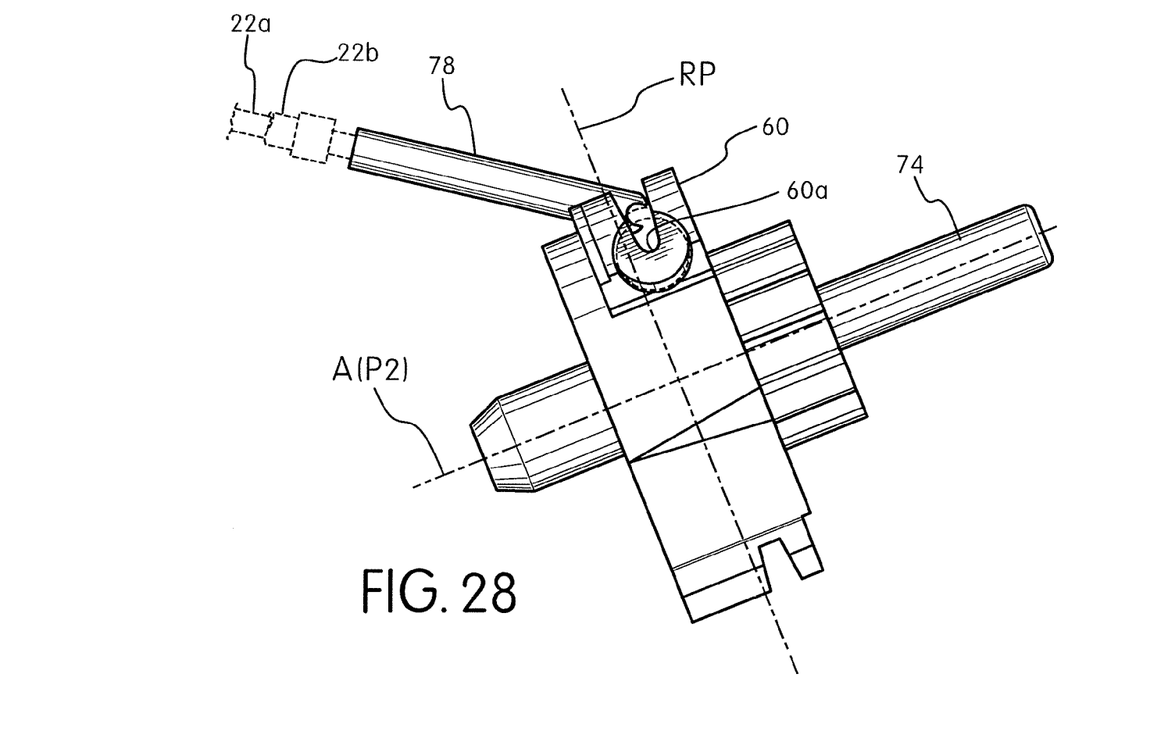
FIG. 28 is an outside elevational view of the cable takeup spool and the guide insert illustrated in FIGS. 25 to 27 further showing the inner wire path of the shift cable.

As best seen in FIGS. 27 and 28, which shows the cable takeup spool 60 and the shift axle 74 removed from the bracket 32, the cable takeup spool 60 is rotated in a rotational plane RP in accordance with the movements of the brake/shift lever 34 and the shift lever 36. The brake/shift lever 34 is configured and arranged to wind the shift cable 20 extending from the cable takeup spool 60 into the inner lateral side 48. On the other hand, the shift lever 36 is configured and arranged to release the shift cable 20 extending from the cable takeup spool 60 out of the inner lateral side 48.

Upon pivoting the brake/shift lever 34 to perform a shifting (winding) operation, the winding pawl 64 engages a tooth of the winding plate 62 for rotating the winding plate 62 on the shift axle 74. The winding plate 62 and the positioning plate 66 are all fixed to the cable takeup spool 60 so that they rotate together as a unit when the brake/shift lever 34 is pivoted to perform a shifting operation. Thus, the cable takeup spool 60 rotates in response to the brake/shift lever 34 being pivoted to perform a shifting operation. The cable takeup spool 60 rotates in the same direction as the brake/shift lever 34 (i.e., counterclockwise as viewed from the front free end of the bracket 32 and along a vertical plane of the bracket 32 that is aligned with the axis A of the shift axle 74). Thus, rotation of the cable takeup spool 60 in the winding direction pulls the inner wire 20a into the bracket 32 so that the inner wire 20a wound on the outer peripheral surface of the cable takeup spool 60. Preferably, the outer peripheral surface of the cable takeup spool 60 has a wire receiving groove 60a for receiving the inner wire 20a as best seen in FIGS. 25 to 28.

When the shift lever 36 is pivoted to perform a shifting (releasing) operation, the release pawl 72 engages a tooth of the release plate 70 and rotates the release plate 70 on the shift axle 74. This rotation of the release plate 70 moves the positioning pawls 68 to release the positioning plate 66 so that the cable takeup spool 60, the winding plate 62 and the positioning plate 66 can all rotate together in a release direction (i.e., clockwise as viewed from the front free end of the bracket 32 and along a vertical plane of the bracket 32 that is aligned with the axis A of the shift axle 74).

As mentioned above, the cable takeup spool 60 rotates in the rotational plane RP to wind and release the inner wire 20a of the shift cable 20. During this movement of the cable takeup spool 60, the shift cable guide portion 56 guides the shift cable 20 along the inner lateral side 48 of the bracket 32. In other words, the shift cable guide portion 56 is arranged at the inner lateral side 48 of the bracket 32 such that the shift cable guide portion 56 guides the shift cable 20 along a guiding direction that is non-parallel to the rotational plane RP of the cable takeup spool 60. The cable takeup spool 60 is arranged such that the rotation plane RP is not arranged in parallel to the bicycle longitudinal center plane CP when the shift operating device 12 is an installed position. In the illustrated embodiment, the shift cable guide portion 56 is provided such that the guiding direction extends primarily rearward from the cable takeup spool 60 when the shift operating device 12 is in an installed position.

Turning now to FIGS. 17 to 28, the shift cable guide portion 56 will now be discussed in more detail. The shift cable guide portion 56 basically has a bulging piece 76 and a guide insert 78. The bulging piece 76 protrudes from the inner lateral side 48 towards the bicycle longitudinal center plane CP. The bulging piece 76 of the shift cable guide portion 56 includes a channel 80 to guide the shift cable 20.

Preferably, the guide insert 78 is provided in the channel 80 of the bulging piece 76. The guide insert 78 is preferably formed of a first material having a first coefficient of friction that is lower than a second coefficient of friction of the shift cable guide portion 56. Of course, it will be apparent from this disclosure that the guide insert 78 is optional.

As seen in FIG. 11, the channel 80 has a first end 82 adjacent the cable takeup spool 60 and a second end 84 spaced from the first end 82. As seen in FIG. 16, the first end 82 of the channel 80 has an opening 82a that is aligned with the winding groove 60a formed on the peripheral surface of the cable takeup spool 60. The channel 80 of the shift cable guide portion 56 includes an inner wire receiving part 86 and a cable case receiving part 88. The inner wire receiving part 86 is located on the first end 82 of the channel 80. The cable case receiving part 88 is located on the second end 84 of the channel 80. The inner wire receiving part 86 receives the guide insert 78.

The inner wire receiving part 86 has a convexly curved guide surface extending between the first end 82 and the cable case receiving part 88 in the guiding direction. The channel 80 is a groove formed in the exterior surface of the shift cable guide portion 56. The inner wire receiving part 86 of the shift cable guide portion 56 includes a first guiding section 90 and a second guiding section 92. Since the guide insert 78 is located in the inner wire receiving part 86, also includes first and second guiding sections that match the first and second guiding sections 90 and 92.

The first guiding section 90 extends initially more outward than rearward from the cable takeup spool 60 towards the bicycle longitudinal center plane CP. After extending initially more outward than rearward from the cable takeup spool 60, the first guiding section 90 then extends primarily rearward towards the handlebar mounting structure 42 provided at a rear end of the bracket 32. The second guiding section 92 extends primarily rearward towards the handlebar mounting structure 42 with respect to the first guiding section 90. In other words, the second guiding section 92 is provided such that the guiding direction of the shift cable 20 is angled primarily in a rearward direction after being initially angled more outwardly than rearward from the cable takeup spool 60 towards the bicycle longitudinal center plane CP when the shift operating device 12 is an installed position.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below", "inner", "outer" and "transverse" as well as any other similar directional terms refer to those directions of a bicycle equipped with the bicycle shift operating device on a flat horizontal surface. Accordingly, these terms, as utilized to describe the bicycle shift operating device should be interpreted relative to a bicycle equipped with the bicycle shift operating device as used in the normal riding position on a flat horizontal surface. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle shift operating device comprising:
   a bracket having first and second opposite ends and including
      a grip section having a lateral side with a shift cable guide portion, the lateral side facing towards a bicycle longitudinal center plane when the shift operating device is in an installed position, and
      a handlebar mounting structure mounted to the bracket at the first end of the bracket;
   a shift lever pivotally mounted to the bracket at the second end of the bracket; and
   a shift operating unit mounted on the bracket, the shift operating unit including a spool, the spool being rotated in a rotational plane in accordance with movement of the shift lever to wind a shift cable extending from the spool to the lateral side, the shift lever having a free end that moves toward the lateral side having the shift cable guide portion as the shift lever pivots from a rest position to an operated position to wind the shift cable,
   the shift cable guide portion being arranged at the lateral side of the bracket such that the shift cable guide portion guides the shift cable along a guiding direction that is non-parallel to the rotational plane of the spool.

2. The bicycle shift operating device according to claim 1, wherein
   the shift cable guide portion is provided such that the shift cable is guided by the shift cable guide portion to a position adjacent the handlebar mounting structure.

3. The bicycle shift operating device according to claim 1, wherein
   the spool is arranged such that the rotation plane is not arranged in parallel to the bicycle longitudinal center plane when the shift operating device is an installed position, and
   the shift cable guide portion is provided such that the guiding direction extends rearward from the spool when the shift operating device is in an installed position.

4. The bicycle shift operating device according to claim 3, wherein
   the shift cable guide portion includes a channel to guide the shift cable, with the channel having a first end adjacent the spool, a second end spaced from the first end, and a convexly curved guide surface extending between the first end and the second end of the channel in the guiding direction.

5. The bicycle shift operating device according to claim 4, wherein the shift cable guide portion includes a cable case receiving part provided on the second end of the channel.

6. The bicycle shift operating device according to claim 4, wherein
the channel is a groove formed in the shift cable guide portion.

7. The bicycle shift operating device according to claim 4, wherein
the first end of the channel is aligned with a winding groove formed on a peripheral surface of the spool.

8. The bicycle shift operating device according to claim 1, wherein
the shift cable guide portion is removably attached on the lateral side.

9. The bicycle shift operating device according to claim 1, wherein
the shift cable guide portion protrudes towards the bicycle longitudinal center plane when the shift operating device is in an installed position.

10. The bicycle shift operating device according to claim 1, wherein
the shift lever includes a brake cable attachment member, with the shift lever pivoting relative to the bracket about a first pivot axis such that movement of the shift lever about the first pivot axis operates the shift operating unit; and the shift lever pivots relative to the bracket about a second pivot axis that is perpendicular to the first pivot axis such that movement of the shift lever about the second pivot axis moves the brake cable attachment member relative to the bracket.

11. The bicycle shift operating device according to claim 10, wherein
the bracket further includes a brake cable guide portion provided on the grip section, which further has an opposite lateral side opposed to the lateral side, the brake cable guide portion being closer to the opposite lateral side than the shift cable guide portion.

12. The bicycle shift operating device according to claim 10, wherein
the bracket further includes a brake cable guide portion provided on the grip section, which further has an opposite lateral side opposed to the lateral side and an upper side disposed between the lateral sides, the brake cable guide portion being closer to the upper side than the shift cable guide portion.

13. The bicycle shift operating device according to claim 1, wherein
the shift cable guide portion is provided such that the guiding direction is at least partially angled more outwardly than rearward from the spool towards the bicycle longitudinal center plane when the shift operating device is an installed position.

14. The bicycle shift operating device according to claim 13, wherein
the shift cable guide portion is further provided such that the guiding direction is subsequently angled primarily in a rearward direction after being initially angled more outwardly than rearward from the spool towards the bicycle longitudinal center plane when the shift operating device is an installed position.

* * * * *